Sept. 14, 1937.   R. P. LANSING   2,093,324
DRIVING MECHANISM
Filed April 21, 1933
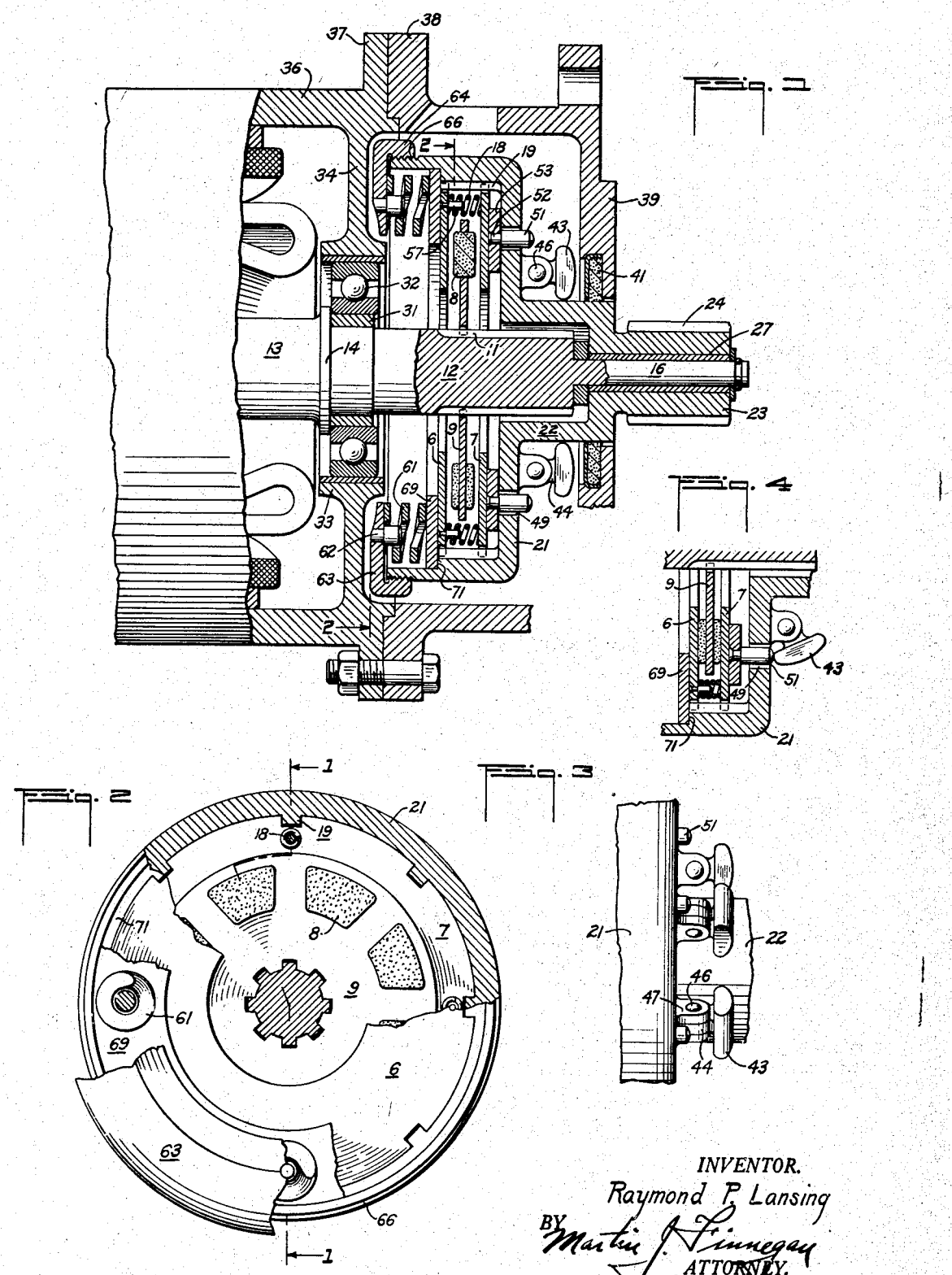
INVENTOR.
Raymond P. Lansing
BY Martin J. Finnegan
ATTORNEY.

Patented Sept. 14, 1937

2,093,324

UNITED STATES PATENT OFFICE 2,093,324

DRIVING MECHANISM

Raymond P. Lansing, Montclair, N. J., assignor, by mesne assignments, to Eclipse Aviation Corporation, East Orange, N. J., a corporation of New Jersey Application April 21, 1933, Serial No. 667,298

1 Claim. (Cl. 192—105)

This invention relates to driving mechanism and more particularly to means for yieldably coupling a driving and driven member.

An object of the present invention is to provide a driving mechanism in which novel means are employed for effecting a friction driving connection of limited torque capacity between the driving and driven members.

Another object of the invention is to provide a friction clutch mechanism in which novel means are employed to regulate the torque capacity and to control the initial engagement of the clutch in such a manner as to provide a gradual assumption of the load as the driving element is accelerated from zero to normal speed.

Another object of the invention is to provide a friction clutch mechanism of the foregoing character wherein any tendency for the torque capacity of the clutch to vary during operation will automatically produce a counteracting tendency operating to restore the parts to their normal relative positions.

The friction clutch mechanism herein disclosed is particularly well suited for controlling the transmission of power from an internal combustion engine to an engine driven accessory such as a generator, and when so used operates to maintain a definite relation between the speed at which the generator is driven and the torque transmitting capacity of the friction elements; but it is to be understood that the invention is not restricted in its application to a mechanism of the kind just referred to, as will be obvious from an examination of the following specification that the device can be used to advantage in other forms of drive wherein automatic regulation of torque transmitting capacity is desirable.

These and other objects and advantages to be derived from the use of the invention herein disclosed will become apparent upon an inspection of the following specification, reference being had to the accompanying drawing, wherein the preferred embodiment of the invention is disclosed. It is to be understood, however, that the drawing is for the purpose of illustration only, and is not designed as a definition of the limits of the invention, reference being had for such purpose to the appended claim.

In the drawing,

Fig. 1 is a longitudinal sectional view of the device embodying the invention;

Fig. 2 is a transverse view partly in section taken along the line 2—2 of Fig. 1;

Fig. 3 is a fragmentary view in elevation showing a portion of the device; and

Fig. 4 is a fragmentary sectional view showing the clutch setting under normal running conditions.

In the drawing, the mechanism is shown embodied in a driving mechanism of the friction type, wherein the friction elements include a plurality of (as shown, two) driving discs 6 and 7 preferably of metallic material, and a driven element preferably in the form of a plurality of segments or blocks 8 of carbon or equivalent friction material, suitably embedded at angularly spaced positions near the periphery of a third disc 9, intermediate the discs 6 and 7, and having splined engagement with splines 11 provided on the portion 12 of the generator shaft 13 which lies between the flange 14 and the reduced end portion 16 of the said shaft.

As shown, the driving discs 6 and 7 are separated by springs 18, and have splined engagement with longitudinal grooves or splines 19 formed on the inner surface of a cup-shaped driving element 21 having a centrally disposed hub portion 22, the inner surface of which surrounds the driven shaft and is integral with an extending portion 23 having suitable splines or teeth 24 adapted to be engaged by a correspondingly formed portion of the engine crankshaft or some element associated therewith.

The extending portion 23 of the driving element is centrally bored to a diameter somewhat larger than that of the reduced end 16 of the driven shaft, thus permitting the provision of a friction reducing sleeve 27 which facilitates relative rotation between the elements 23 and 16 and permits the former to act as a support for one end of the driven shaft 13. The intermediate portion of the driven shaft is supported by sleeve and ball bearings designated by reference characters 31 and 32 respectively, the said bearings being seated in the hub portion 33 of a transversely disposed end portion 34 of the generator housing 36.

As shown, the housing 36 has an outwardly extending flange 37 adapted to register with a similar flange 38 provided on the cup-shaped casing 39 which encloses the driving mechanism. If desired, the housing 39 may have associated therewith a packing 41 contacting the periphery of the hub portion 22 of the driving element and thus preventing entry of dust or foreign matter into the casing.

The speed responsive means operating to control the torque transmitting capacity of the friction elements 6, 7 and 8 preferably comprises a plurality of weights 43 each of which has a shank 44 centrally apertured to receive a pin 46 by which it is pivotally mounted in a pair of bearing blocks or ears 47 constituting integral extensions of the cup-shaped driving member 21 and provided on said element 21 at angularly spaced intervals at equal distance from its hub 22. Extending through openings 49 in the cup 21 are pins or studs 51 corresponding in number and angularly spacing to the number and spacing of weights 43, the said studs being suitably embedded as indicated at 52, in a disc 53 enclosed between cup 21 and the first friction element 7, the latter being yieldingly maintained in contact with the disc 53 by the action of the compression springs 16. Preferably springs 16 are held in angularly spaced relation by suitable positioning studs 57 embedded in friction driving element 6 at equal points thereon equidistant from the center thereof. A corresponding number of compression springs 61 of larger diameter and greater strength are similarly held by positioning studs 62 provided at equally spaced intervals equidistant from the center of an adjusting nut 63, having a rim 64, internally threaded to engage corresponding threads 66 formed at the end portion of the outer surface of the cup 21 and thus providing means for regulating the degree of pressure exerted by the springs 61 to maintain the pressure plate 69 contacted at all times with one side of the friction disc 6, the said pressure plate 69 being engageable with an abutment 71 constituted by counter-boring the cup 21 for a suitable distance.

Preferably the strength and setting of springs 61 is such that the pressure plate 69 is normally held in engagement with the abutment 71, and thus resists leftward (as viewed in Fig. 1) movement of the driving disc 6, even after the other friction elements 7 and 8 have been moved into contact therewith by the pressure which the swinging weights 43 exert upon the studs 51 in response to centrifugal force. In the event, however, of occasional speed fluctuations, or in the event of a change in the torque transmitting qualities of the friction surfaces themselves, the resulting slippage and consequent acceleration of the driving element 21 produces an additional thrust upon the studs 51, thus overcoming the pressure of the springs 61 to a greater or less degree, so that the latter yield correspondingly, thus permitting the pressure plate 69 to be moved away from the abutment 71. This yielding is only temporary however, and the resultant increased deflection of springs 61 causes them to rebound toward plate 69 as soon as the temporary accelerating impulse recedes, and said springs 61 again become effective to restore plate 69 to its position of contact with abutment 71, and the clutch parts resume the relative positions indicated in Fig. 4.

It will be seen, therefore, that the springs 61 exert a compensating effect tending to maintain torque transmitting capacity constant notwithstanding fluctuation in the speed or friction characteristics of the clutch surfaces except during the period of starting, when it is desirable that the friction discs 6 and 7 take hold of the blocks 8 gradually and with sufficient yielding to eliminate shock as much as possible, there will be at no time a complete release of the hold upon the blocks 8, and for any given speed the clutch will continue to transmit a definite corresponding amount of power.

While in the drawing the springs 16 are shown as a means of cushioning the intensity of the frictional engagement of the discs 6 and 7 with the blocks 8, it is to be understood that these springs may be eliminated if a constant light engagement of the discs 6 and 7 with the blocks 8 is considered unobjectionable, as may be the case in certain installations, and that various other changes may be made in the construction, arrangement and interrelation of the parts constituting the invention without departing from the spirit thereof, the extent of the included variations being ascertainable by reference to the appended claim.

What is claimed is:

In a device of the class described, a driving drum, a driven shaft, an abutment integral with said driving drum, a friction clutch mechanism interposed in a position to drivably connect said drum and said shaft, said mechanism including a pair of driving plates secured to said drum and a driven plate secured to said driven shaft, a pressure plate engageable with said abutment and also in constant engagement with one of said driving plates, speed responsive means for moving the other of said driving plates into engagement with said driven plate, but only after an interval of preliminary movement, the further movement of said speed responsive means being effective to shift the complete clutch mechanism to an extent sufficient to move said pressure plate away from said abutment, resilient means constantly exerting a countertendency to hold said pressure plate in contact with said abutment, and additional resilient means operating directly upon said driving plates to thereby indirectly prevent any frictional contact whatever along at least one face of said driven clutch element during the stage of preliminary movement of said speed responsive means.

RAYMOND P. LANSING.